United States Patent Office 3,039,940
Patented June 19, 1962

3,039,940
PURIFICATION
Roy Prinz, Robstown, and James Gann and James Ramey, Bishop, Tex., assignors to Celanese Corporation of America, New York, N.Y., a corporation of Delaware
No Drawing. Filed Nov. 2, 1959, Ser. No. 850,018
13 Claims. (Cl. 202—39.5)

This invention relates to a purification process. More particularly, it relates to a process for the production of purified propylene oxide from a crude mixture of organic compounds containing the propylene oxide as its main constituent.

The vapor phase, partial oxidation of aliphatic hydrocarbons such a propane or butane, or mixtures thereof, employing air or oxygen as the oxidizing agent, results in the production of a complex mixture of products including methanol, formaldehyde, acetaldehyde, propionaldehyde, allyl alcohol, isopropyl alcohol, n-propyl alcohol, isobutanol, secondary butanol, n-butanol, acetone, methyl ethyl ketone, methylal, acrolein, tetrahydrofuran, methyl formate, and other esters, acetals, formals and oxides, as well as numerous other aliphatic compounds. In order to separate the complex mixture of oxidation products and to purify each of the components so that they will be suitable for commercial use, an intricate purification system is necessary. The purification involves a number of operations yielding a number of crude fractions, each containing a considerable number of compounds. One such fraction obtained is a crude mixture chiefly containing an alkylene oxide, e.g. 1,2-propylene oxide, but also containing a minor proportion of methylal among other impurities. For some uses it is desirable that the methylal content be very low, but it has been found to be very difficult to recover propylene oxide with such a low methylal content from the crude mixture by straight distillation techniques owing to the similar relative volatilities of both the alkylene oxide and the methylal impurities.

Accordingly, it is an object of this invention to provide a method of purifying a crude mixture containing propylene oxide.

Another object is to provide a method of removing methylal from a crude mixture comprising propylene oxide and methylal.

A further object is to provide a method for extractively distilling a crude mixture comprising propylene oxide and methylal whereby separation of these two components is achieved.

In accordance with one aspect of the invention, a crude mixture comprising the propylene oxide and methylal is extractively distilled using a hydrocarbon as the extractive solvent. The hydrocarbon functions in such a manner as to reduce the volatility of the methylal relative to the alkylene oxide during the course of the extractive distillation.

Examples of suitable hydrocarbons for use in this invention are cyclohexane, iso-octane and kerosene. Hydrocarbons whose boiling points are at least about 60° C. are preferred, although lower boiling hydrocarbons may be used.

For continuous operation, the crude mixture containing the alkylene oxide and methylal may be fed continuously to an intermediate point of a distillation column. The hydrocarbon extractant may be continuously charged to a higher point on the column. Heat may be supplied by means of a reboiler at the base of the column, from which extractant containing methylal may be withdrawn. The column may be provided with suitable packing or, preferably, a plurality of bubble cap plates. The column may be operated under reflux and the purified propylene oxide may be removed as overhead from the column.

The residue of extractant and methylal is usually withdrawn continuously from the column at a point below the point at which the mixture of propylene oxide and methylal is fed. It is preferable to maintain this withdrawal point, which is generally at the base of the column, at a temperature sufficiently high to minimize the propylene oxide content of the residue. The best temperature for this purpose will depend on the particular extractant employed, but it is desirable to employ a temperature above about 80° C. when operating at about atmospheric pressure. With kerosene, the use of a temperature above 100° C., preferably above about 120° C., e.g. about 130–150° C., results in a residue containing very little propylene oxide. With iso-octane a temperature of about 84 to 86° C. gives a very good balance of minimizing both the propylene oxide content in the residue and the holdup of methylal in the column.

While the extractant fed to the column may be heated or unheated, we have found that excellent results are obtained by heating the extractant to a temperature at or near the boiling temperature of propylene oxide at the pressure of operation of the column. For example for operation at atmospheric pressure the extractant feed temperature may be about 30–45° C. The column may, if desired, be operated at subatmospheric or superatmospheric pressure, although atmospheric pressure is most convenient.

When the more volatile extractants, e.g. iso-octane or cyclohexane, are employed, there is a tendency for some of the extractant to appear in the overhead from the column. The proportion of extractant in the overhead may be reduced by further distillation of the overhead, preferably by having a fractional distillation zone on the column above the point where the extractant is fed to the column. The vapors arising above the extractant feed point are fed into the bottom of this additional zone, from the top of which there is taken off propylene oxide containing little, if any, extractant, while an internal reflux of extractant leaves from the bottom of the additional zone. For example, in one run, operating at atmospheric pressure, using a 50 tray column into which iso-octane was fed from the top the overhead product (which came overhead at a temperature of 40° C.) was very low in methylal but contained about 14% iso-octane; when a 15 tray section was added above the iso-octane feed point the iso-octane content of the overhead product (whose vapor temperature was 34° C.) was less than 0.1%.

The ratio of extractant to crude feed can be varied, depending in part on the other conditions. For example, we have used ratios of 1.5:1 to 13:1 with good results. In general a ratio in the range of about 4:1 to 10:1 is preferred.

The residue of hydrocarbon extractant and methylal, may be distilled, e.g. by flash distillation, to recover the extractant (as heavy ends), which may then be recycled to the extractive distillation column. The light ends from the flash distillation comprise the methylal and minor amounts of the alkylene oxide. Alternatively the methylal may be recovered from the extractant by extraction of the mixture with water, in which methylal is soluble.

The following examples will further illustrate our invention. All parts are by weight unless otherwise indicated.

EXAMPLE I

Three milliliters per minute of a crude mixture containing approximately 78.9% by weight of 1,2-propylene oxide, 18.8% of methylal, and the balance principally methanol were introduced at the top of a 25 tray bottom section of a two section packed laboratory distillation column, while 21 milliliters per minute of kerosene were simultaneously introduced above the 20 tray top section of the column. Heat was supplied to the column so that the temperature was maintained at about 35° C. at the top of the column, at about 41° C. at the crude mixture feed tray, and at about 130° C. at the base of the column. The reflux ratio was kept at 10:1. The overhead product consisted of 94.6% propylene oxide and 1.8% methylal. 1080 milliliters of the overhead product were redistilled bath-wise in a packed laboratory column having an equivalent of 50 trays at a reflux ratio of 10:1. The redistilled product analysis (heartcut) was 98.8% proplene oxide, 0.3% methylal, and traces (less than one percent) of methanol, furane, and methyl formate. The bulk of the methyl formate and furane may be removed by taking a small (e.g. 5%) light ends cut.

The heavy ends from the extractive distillation, comprising the kerosene extractant, methylal, and traces of 1,2 proplene oxide, were continuously flash distilled to distil off the methylal and propylene oxide. The kerosene, recovered in the heavy ends, was recycled into the column for further methylal extraction.

EXAMPLE II

The procedure of Example I was repeated except that the reflux ratio was held at 5:1 and the ratio of kerosene extractant feed to crude mixture feed was varied. The results are given in Table I below.

Table I

| Feed Ratio, Kerosene:Oxide | Infrared Analysis of Overhead Product, Weight Percent | |
| --- | --- | --- |
| | 1,2-propylene oxide | Methylal |
| 1.5:1 | 93.7 | 2.8 |
| 6.7:1 | 94.1 | 2.6 |
| 7:1 | 95.8 | 1.1 |
| 10:1 | 97.1 | 1.2 |

EXAMPLE III

The procedure of Example I was repeated, except that the feed ratio was held at 7:1 (7 parts kerosene to 1 part crude feed mixture) and the reflux ratio was 10:1. The overhead product contained 95.3% 1,2-propylene oxide and 0.3% methylal.

EXAMPLE IV

A mixture containing 31.2% methylal and 65.7% 1,2-propylene oxide by weight and the balance principally methanol and some water was fed to a three-section distillation column. The lower two sections, which were vacuum-jacketed and packed, were of one inch internal diameter (the bottom section being two feet high and the next section being three feet high, the packing being such that these two sections were equivalent to about 50 trays) and the top section was a 15-tray Oldershaw column. The methylal-propylene oxide mixture was fed just above the bottom section while iso-octane (2,2,4-trimethylpentane) was fed, as the extractant, just above the second section at a rate equal to 5.8 volumes of extractant per volume of the methylal-propylene oxide mixture. The base of the composite column was maintained at 84.1° C., the extractant feed point of the composite column was maintained at 41.1° C. and the vapors at the top of the tower were at 34.2° C. The composite column was fitted with a reflux condenser, and the reflux ratio was 5:1. The residue from the base of the column was treated to remove the methylal, by fractional distillation in a packed column 6 feet high (60 theoretical trays), and then recycled to the extractive distillation column for use as the extractant.

EXAMPLE V

An extractive distillation was carried out using cyclohexane as the extractant with a crude mixture of 62.5% by weight of 1,2-propylene oxide, 34% methylal and the balance principally methanol and some water. Five volumes of extractant were fed to the top of a distillation column for each volume of crude mixture fed to an intermediate point on the column. From the base of the column, at a temperature of 69.3° C. a stream of cyclohexane containing methylal was drawn off. The column was operated at an overhead temperature of 36.4° C. with an external reflux ratio of 5:1. In the overhead vapors, which contained about 15% cyclohexane, the weight ratio of propylene oxide to methylal was 41.6:1.

All the above examples were carried out at atmospheric pressure.

It should be noted that straight fractional distillation of the crude mixture without the use of a hydrocarbon extractant such as kerosene does not effectively separate the alkylene oxide from the methylal. Similarly, the use of water as the extractant rather than a hydrocarbon mixture such as kerosene does not result in an effective removal of the methylal from the crude mixture containing the alkylene oxide and methylal.

Accordingly, it will be understood that the foregoing detailed description is given merely by way of illustration and that many variations can be made therein without departing from the spirit of our invention.

Having described our invention, what we desire to secure by Letters Patent is:

1. A process for the separation of propylene oxide from a crude mixture containing the propylene oxide and containing methylal as an impurity, comprising subjecting the crude mixture to an extractive distillation with a hydrocarbon solvent as the extractant.

2. The process of claim 1 wherein the extractant is kerosene.

3. The process of claim 1 wherein the extractant is iso-octane.

4. The process of claim 1 wherein the extractant is cyclohexane.

5. The process of claim 1 wherein the purified propylene oxide is removed as the distillate.

6. A process for the separation of propylene oxide from a crude mixture of propylene oxide containing methylal as an impurity which comprises subjecting the crude mixture to an extractive distillation with a hydrocarbon boiling at least about 60° C.

7. The process of claim 6 wherein the purified propylene oxide is removed as the distillate.

8. Process for the separation of 1,2-propylene oxide from a mixture of propylene oxide and a minor proportion of methylal which comprises continuously feeding said mixture to a point on a distillation column, continuously feeding a liquid hydrocarbon extractant boiling at least about 60° C. to a point on said column higher than said first-named point, continuously withdrawing a blend comprising said extractant and most of the methylal from said column at a point lower than said first named point and continuously withdrawing vapors having a higher proportion of propylene oxide than said mixture from a point at least as high as the extractant feed point.

9. Process as set forth in claim 8 in which said extractant is iso-octane.

10. Process as set forth in claim 8 in which said vapors are withdrawn from a point above the extractant feed point.

11. Process as set forth in claim 8 in which the temperature of said lower point is at least about 80° C.

12. Process as set forth in claim 8 in which the volumetric feed ratio of said extractant to said mixture is at least 1.5:1.

13. Process as set forth in claim 8 and including the steps of separating methylal from said withdrawn blend and recycling the withdrawn extractant after said separation.

References Cited in the file of this patent
UNITED STATES PATENTS

| | | |
|---|---|---|
| 2,500,596 | Adelson et al. | Mar. 14, 1950 |
| 2,591,714 | Murrell | Apr. 8, 1952 |
| 2,622,060 | Robeson et al. | Dec. 16, 1952 |
| 2,710,829 | Michael | June 14, 1955 |
| 2,791,550 | West et al. | May 7, 1957 |